US012435982B2

(12) United States Patent
Robinson et al.

(10) Patent No.: US 12,435,982 B2
(45) Date of Patent: Oct. 7, 2025

(54) DIGITAL WAYFINDING

(71) Applicant: BUELLER RNDS, INC., Austin, TX (US)

(72) Inventors: Alec Robinson, Rollingwood, TX (US); Jayson Aydelotte, Rollingwood, TX (US); Gary Peil, College Station, TX (US)

(73) Assignee: BUELLER RNDS, INC., Austin, TX (US)

( * ) Notice: Subject to any disclaimer, the term of this patent is extended or adjusted under 35 U.S.C. 154(b) by 158 days.

(21) Appl. No.: 18/169,927

(22) Filed: Feb. 16, 2023

(65) Prior Publication Data

US 2023/0258459 A1 Aug. 17, 2023

Related U.S. Application Data

(60) Provisional application No. 63/311,167, filed on Feb. 17, 2022.

(51) Int. Cl.
*G01C 21/00* (2006.01)
*G01C 21/34* (2006.01)
(Continued)

(52) U.S. Cl.
CPC ..... *G01C 21/3407* (2013.01); *G01C 21/3676* (2013.01); *G01C 21/3679* (2013.01); *G06F 3/0482* (2013.01); *G06K 19/06037* (2013.01)

(58) Field of Classification Search
None
See application file for complete search history.

(56) References Cited

U.S. PATENT DOCUMENTS

| 7,460,953 B2 * | 12/2008 | Herbst | G06Q 30/0251 |
| | | | 701/438 |
| 8,150,617 B2 * | 4/2012 | Manber | H04L 67/52 |
| | | | 701/484 |

(Continued)

FOREIGN PATENT DOCUMENTS

| WO | 2015094143 A1 | 6/2015 |
| WO | 2016043663 A1 | 3/2016 |

(Continued)

OTHER PUBLICATIONS

Hammadi et al., "Indoor Localization and Guidance Using Portable Smartphones," 2012 IEEE/WIC/ACM International Conferences on Web Intelligence and Intelligent Agent Technology, Macau, China, 2012, pp. 337-341.

(Continued)

*Primary Examiner* — Jonathan M Dager
(74) *Attorney, Agent, or Firm* — Trop, Pruner & Hu, P.C.

(57) ABSTRACT

An embodiment includes at least one machine-readable medium having stored thereon data which, if used by at least one machine, causes the at least one machine to perform operations comprising: displaying a QR code; in response to displaying the QR code, displaying a graphical user interface (GUI), wherein the GUI displays: (1) a first option to locate a first location from a plurality of locations, (2) a second option to locate a second location from the plurality of locations, and (3) a third option to add a third location to the plurality of locations; in response to a user selection of the GUI's third option, determining a physical location of the third location via a global positioning system (GPS); in response to determining the physical location of the third location, displaying the third location on a map.

18 Claims, 12 Drawing Sheets

(51) Int. Cl.
*G01C 21/36* (2006.01)
*G06F 3/0482* (2013.01)
*G06K 19/06* (2006.01)

(56) References Cited

U.S. PATENT DOCUMENTS

| | | | |
|---|---|---|---|
| 8,320,939 B1* | 11/2012 | Vincent | G01C 21/206 709/224 |
| 8,849,560 B2 | 9/2014 | Stefani et al. | |
| 8,994,726 B1* | 3/2015 | Furukawa | G06T 17/10 345/420 |
| 9,288,631 B2* | 3/2016 | Felt | H04W 4/029 |
| 9,702,706 B2* | 7/2017 | Liu | G06Q 30/0259 |
| 10,127,633 B2* | 11/2018 | Gold | G06F 3/0482 |
| 10,136,260 B2* | 11/2018 | Parulski | H04W 4/024 |
| 10,142,795 B2* | 11/2018 | Colosky | H04W 4/33 |
| 10,489,663 B2* | 11/2019 | Olson | G05D 1/0251 |
| 10,636,207 B1* | 4/2020 | Swidersky | G01C 21/383 |
| 10,753,762 B2* | 8/2020 | Shelby | G06F 16/00 |
| 10,817,563 B2* | 10/2020 | Parulski | G06F 16/687 |
| 10,921,131 B1* | 2/2021 | Cruz | H04W 4/024 |
| 10,999,617 B2* | 5/2021 | Bermeister | A63F 13/80 |
| 11,007,644 B2* | 5/2021 | Wiegel | B25J 9/1666 |
| 11,168,990 B2* | 11/2021 | Ozog | G06F 16/235 |
| 11,199,412 B2* | 12/2021 | Kordari | G01C 21/383 |
| 11,593,535 B2* | 2/2023 | Shapiro | G06Q 10/06313 |
| 11,743,689 B2* | 8/2023 | Shapiro | G01C 21/206 455/456.2 |
| 12,152,886 B2* | 11/2024 | Gale | G01C 21/383 |
| 2001/0034661 A1* | 10/2001 | Ferreira | G06Q 30/0643 705/26.8 |
| 2001/0037305 A1* | 11/2001 | Mochizuki | G08G 1/096866 705/52 |
| 2002/0044690 A1* | 4/2002 | Burgess | G06F 16/29 382/209 |
| 2002/0047895 A1* | 4/2002 | Bernardo | G06F 16/29 382/284 |
| 2002/0065691 A1* | 5/2002 | Twig | H04L 67/306 |
| 2002/0070981 A1* | 6/2002 | Kida | G06T 17/05 715/833 |
| 2002/0145620 A1* | 10/2002 | Smith | G06F 16/29 707/999.003 |
| 2002/0154174 A1* | 10/2002 | Redlich | G06F 16/954 715/848 |
| 2002/0163547 A1* | 11/2002 | Abramson | G06F 3/0481 715/855 |
| 2003/0016228 A1* | 1/2003 | Youngblood | G06T 3/4038 345/582 |
| 2003/0063133 A1* | 4/2003 | Foote | G06F 16/29 715/850 |
| 2003/0182052 A1* | 9/2003 | DeLorme | G06Q 10/047 340/990 |
| 2005/0192025 A1* | 9/2005 | Kaplan | H04W 4/029 455/414.1 |
| 2006/0004512 A1* | 1/2006 | Herbst | G06Q 30/0241 701/431 |
| 2006/0089792 A1* | 4/2006 | Manber | H04L 67/04 707/E17.11 |
| 2007/0136259 A1* | 6/2007 | Dorfman | G06F 3/0485 |
| 2007/0143676 A1* | 6/2007 | Chen | G06Q 30/06 701/538 |
| 2009/0216438 A1* | 8/2009 | Shafer | G01C 21/206 701/414 |
| 2010/0088017 A1* | 4/2010 | Ujino | G01C 21/3647 707/705 |
| 2012/0029817 A1* | 2/2012 | Khorashadi | G09B 29/106 701/451 |
| 2012/0066035 A1* | 3/2012 | Stanger | G01S 5/02521 705/14.1 |
| 2012/0323612 A1* | 12/2012 | Callaghan | G06Q 10/02 705/5 |
| 2014/0132400 A1* | 5/2014 | Heaven | A63G 31/00 455/414.1 |
| 2014/0136100 A1* | 5/2014 | Drysdale | G01C 21/3679 701/461 |
| 2014/0209671 A1 | 7/2014 | Finlow-Bates et al. | |
| 2014/0347492 A1* | 11/2014 | Fales | H04N 23/11 348/164 |
| 2015/0006319 A1 | 1/2015 | Thomas et al. | |
| 2015/0039461 A1 | 2/2015 | Gadre et al. | |
| 2015/0121235 A1 | 4/2015 | Chen | |
| 2015/0219467 A1 | 8/2015 | Ingerman et al. | |
| 2015/0248498 A1 | 9/2015 | Han | |
| 2015/0278381 A1 | 10/2015 | Leeds | |
| 2015/0379618 A1 | 12/2015 | Neumann | |
| 2016/0131487 A1* | 5/2016 | Xu | H04W 4/029 701/408 |
| 2016/0373906 A1 | 12/2016 | Khan | |
| 2017/0031925 A1* | 2/2017 | Mishra | G06F 16/444 |
| 2018/0249298 A1* | 8/2018 | Jain | G06V 20/36 |
| 2019/0172165 A1* | 6/2019 | Verteletskyi | G06Q 50/265 |
| 2020/0011696 A1* | 1/2020 | Vijayakumari Mahasenan | G06Q 10/087 |

FOREIGN PATENT DOCUMENTS

| | | |
|---|---|---|
| WO | 2016094407 A1 | 6/2016 |
| WO | 2017045013 A1 | 3/2017 |
| WO | 2018016184 A1 | 1/2018 |

OTHER PUBLICATIONS

Fino et al., "Interactive Tourist Guide: Connecting Web 2.0, Augmented Reality and QR Codes", Procedia Computer Science, vol. 25, 2013, pp. 338-344.

Jang, "A qr code-based indoor navigation system using augmented reality", GIScience—Seventh International Conference on Geographic Information Science, USA, 2012.

Basiri et al., "The use of quick response (QR) codes in landmark-based pedestrian navigation", International Journal of Navigation and Observation, vol. 2014, Article ID 897103, 7 pages.

"Map Location QR Code Generator", Tago.com, downloaded from https://www.youtube.com/watch?v=efhqm-a8tq0.

Chang et al., "Mobile computing for indoor wayfinding based on bluetooth sensors for individuals with cognitive impairments," 2008 3rd International Symposium on Wireless Pervasive Computing, Santorini, 2008, abstract.

Kunhoth et al., "Indoor positioning and wayfinding systems: a survey", Human-centric Computing and Information Sciences, vol. 10, Article 18, 2020.

* cited by examiner

Fig. 1
Users scan QR coded signage placed at strategic locations on event grounds.
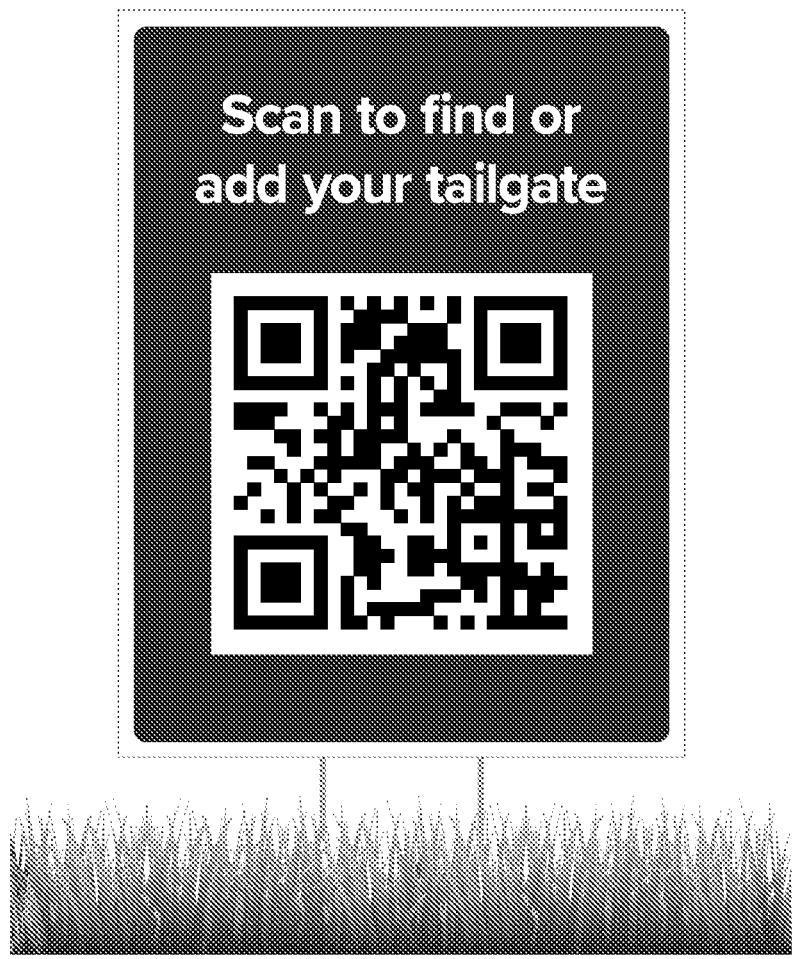

Brought to you by Tailgate Guys

Instructions

Walk to your location

Press here to mark spot

Brought to you by Tailgate Guys

Create Your Tailgate
Tailgate Name
UTRules
First Name
Last Name
Email Address
Tailgate Name
Choose your tailgate icon color
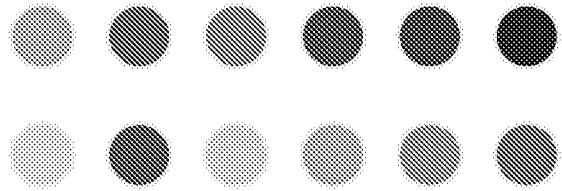
Fig. 7

DIGITAL WAYFINDING

CROSS-REFERENCE TO RELATED APPLICATION

This application claims priority to U.S. Provisional Patent Application No. 63/311,167 filed on Feb. 17, 2022 and entitled "Digital Wayfinding", the content of which is hereby incorporated by reference.

BACKGROUND

Wayfinding refers to information systems that guide people through a physical environment and enhance their understanding and experience of the space.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIG. 1 includes a QR code in an embodiment.
FIG. 7 includes a GUI in an embodiment.

DETAILED DESCRIPTION

Figure 2:
FIG. 2 includes a GUI in an embodiment.
Figure 2:
Figure 2:

Reference will now be made to the drawings wherein like structures may be provided with like suffix reference designations. In order to show the structures of various embodiments more clearly, the drawings included herein are diagrammatic representations of structures. Thus, the actual appearance of the fabricated structures, for example in a photo, may appear different while still incorporating the claimed structures of the illustrated embodiments (e.g., walls may not be exactly orthogonal to one another in actual fabricated devices). Moreover, the drawings may only show the structures useful to understand the illustrated embodiments. Additional structures known in the art may not have been included to maintain the clarity of the drawings. For example, not every layer of a device is necessarily shown. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Phrases such as "comprising at least one of A or B" include situations with A, B, or A and B.

Embodiments of the invention focus on a way to use QR codes to provide digital wayfinding through a local device (such as a cell phone) for complicated environments that are temporary and changing in nature. Currently, digital wayfinding is primarily done from a set of fixed points to a set of fixed locations. Where current solutions fall short is in the ability to provide directions to locations that are temporary and changing in nature. Such as tailgating tents on a college campus, or the layout of temporary booths or displays at a convention or fair.

An embodiment addresses this problem by providing a process to allow temporary events to update a list of locations and display those locations on a map in real time. The QR codes used to access the map can then be re-used when a new set of destinations is created for the same physical space.

For example, the area around a college campus is used for setting up tailgating tents and structures on gameday. The precise location of specific tents and structures changes from week to week. Our system allows for those locations to be entered and changed on the map in real time. Each week or day, the map can be updated with a fresh list of locations and destinations while using a set of QR codes that can remain the same.

The ability to have a permanent set of QR codes that can be re-used to point to different temporary locations, destinations, and configurations on a map is a novel feature that gives a new level of flexibility in digital wayfinding in environments that are consistently hosting temporary events-fairgrounds, convention centers, parks, golf courses, and campuses are a few of the locations that would benefit from the solution.

The following discussion relates to FIGS. 1-8. An embodiment provides a "self-service" tool for a user to aid others in finding a particular location.

As used herein "page" and "figure" are used interchangeably.

Examples of various embodiments are now addressed.

Figure 5:
FIG. 5 includes a GUI in an embodiment.
Figure 5:
Figure 5:
Figure 5:
Figure 5:
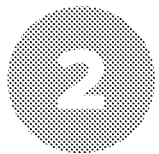
Figure 6:
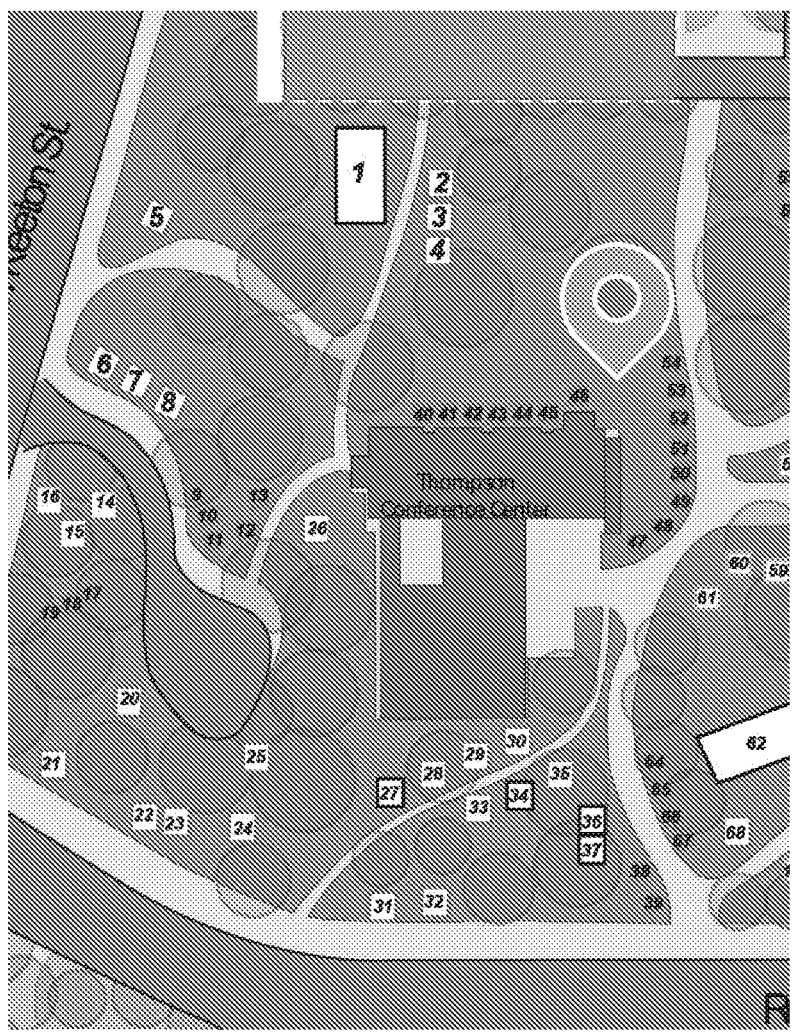
FIG. 6 includes a GUI in an embodiment.
Figure 9:
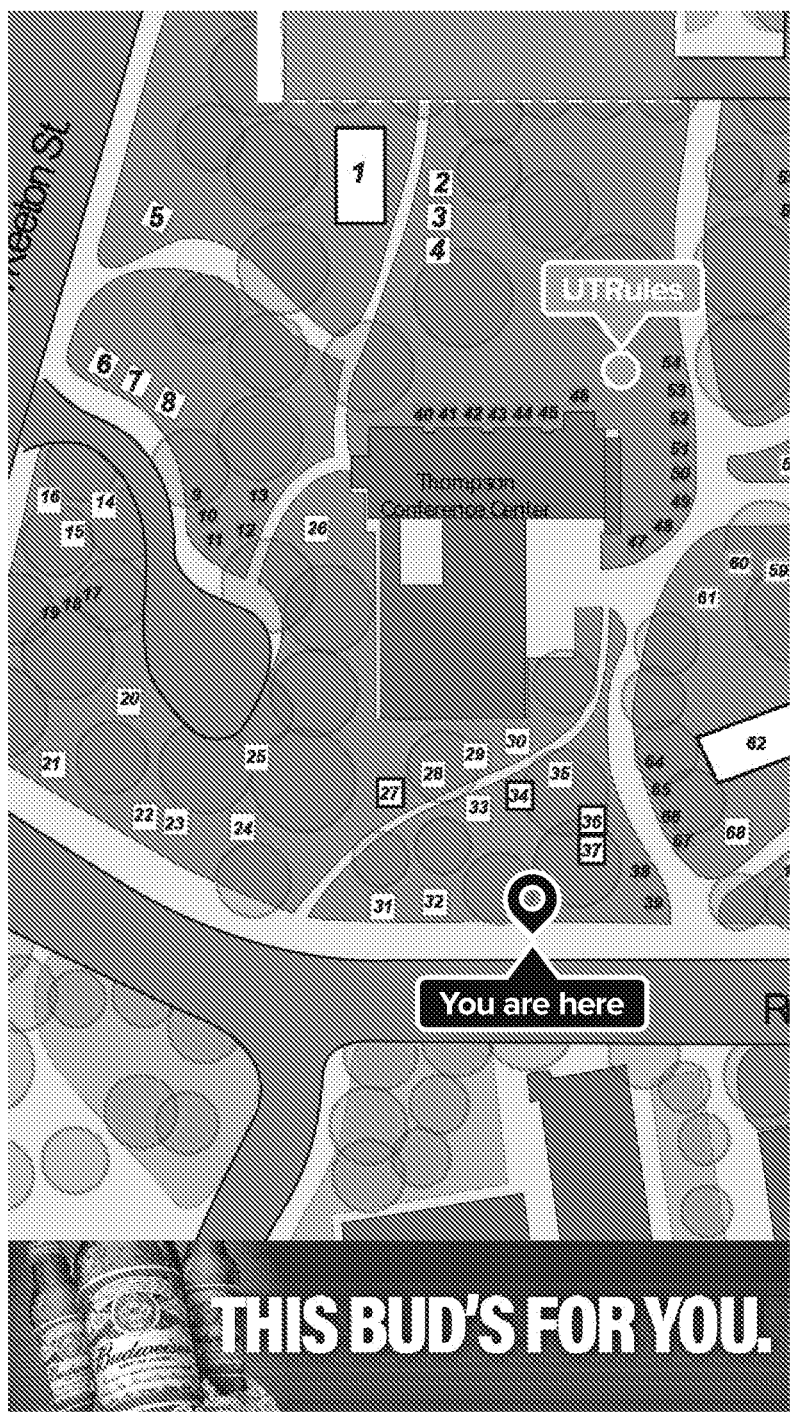
FIG. 9 includes a GUI in an embodiment.

Example 1. At least one machine-readable medium having stored thereon data which, if used by at least one machine, causes the at least one machine to perform operations comprising displaying a QR code (e.g., FIG. 1). As shown in FIG. 2, the operations further comprise, in response to displaying the QR code, displaying a graphical user interface (GUI), wherein the GUI displays: (1) a first option to locate a first location [e.g., a seat included a group of seats] from a plurality of locations, (2) a second option to locate a second location [e.g., a tailgate in a group of tailgates, such as the already entered/logged "Endeavor" tailgate shown on FIG. 3] from the plurality of locations, and (3) a third option to add a third location [e.g., a tailgate in a group of tailgates, such as the "UTRules" tailgate] to the plurality of locations. The operations further comprise, in response to a user selection of the GUI's third option, determining a physical location of the third location via a global positioning system (GPS) (FIGS. 5-6). The operations further comprise in response to determining the physical location of the third location, displaying the third location on a map (FIG. 9).

While example 1 addresses, for example, adding a tailgate to a group of tailgates, other embodiments may address adding a user's seat to a group of seats, and the like.

A QR code (an initialism for quick response code) is a type of matrix barcode (or two-dimensional barcode). A barcode is a machine-readable optical label that can contain information about the item to which it is attached. A QR code may include data for a locator, identifier, or tracker that points to a website or application. A QR code may use, for example, standardized encoding modes (numeric, alphanumeric, byte/binary, and kanji) to store data efficiently. Embodiments used herein are not limited to QR codes and may instead substitute a more general barcode or other unique identifier where ever a QR is included in any of the claims.

As used herein, "displaying a QR code" may include actually generating a QR code and displaying it on a screen. For example, the system may include more than one display. The system may display a QR code on a screen (several of which may be located on grounds, such as a campus, where the event is occurring) and the system software (which may be distributed among distantly located nodes) may then display that QR code on the user's screen (via the user's camera of the user's cell phone) and then scan the QR code. In other words, software or logic "displaying" a QR code may be a first display of a first computing node displaying a QR code from which a user may scan the QR code and display that QR code using a second computing node. In such case, the displaying of a QR code is actually performed twice—once on each of two computing nodes.

Alternative version of Example 1. At least one machine-readable medium having stored thereon data which, if used by at least one machine, causes the at least one machine to perform operations comprising: in response to communicating with a QR code, displaying a graphical user interface (GUI), wherein the GUI displays: (1) a first option to locate a first location [e.g., a seat included a group of seats] from a plurality of locations, (2) a second option to locate a second location [e.g., a tailgate in a group of tailgates] from the plurality of locations, and (3) a third option to add a third location [e.g., a tailgate in a group of tailgates] to the plurality of locations. FIG. 2. The operations further comprise in response to a user selection of the GUI's third option, determining a physical location of the third location via a global positioning system (GPS) (FIGS. 5-6). The operations further comprise in response to determining the physical location of the third location, displaying the third location on a map (FIG. 9).

Thus, an alternative version does not require a QR code to be displayed digitally. For example, a QR code may be physically printed and located on physical signage for a period of time (e.g., during an athletic season that may extend several months).

Alternative version of Example 1: At least one machine-readable medium having stored thereon data which, if used by at least one machine, causes the at least one machine to perform operations comprising: displaying a QR code (FIG. 1). The operations further comprise in response to displaying the QR code, displaying a graphical user interface (GUI), wherein the GUI displays: (1) a first option to locate a first location [e.g., a tailgate in a group of tailgates] from a plurality of locations, and (2) a second option to add a second location [e.g., a tailgate in a group of tailgates] to the plurality of locations. The operations further comprise in response to a user selection of the GUI's second option, determining a physical location of the second location via a global positioning system (GPS) (FIGS. 5-6). The operations further comprise in response to determining the physical location of the second location, displaying the second location on a map.

Thus, a modified GUI may, for example, omit the option to find a seat but instead just focus on the tailgate aspect of the event (i.e., present two options instead of three or more).

Alternative version of Example 1. At least one machine-readable medium having stored thereon data which, if used by at least one machine, causes the at least one machine to perform operations comprising: in response to communicating with a QR code, displaying a graphical user interface (GUI), wherein the GUI displays: (1) a first option to locate a first location [e.g., a seat included a group of seats] from a plurality of locations, (2) a second option to locate a second location [e.g., a tailgate in a group of tailgates] from the plurality of locations, and (3) a third option to add a third location [e.g., a tailgate in a group of tailgates] to the plurality of locations. FIG. 2. The operations further comprise in response to a user selection of the GUI's third option, determining a physical location of the third location (FIGS. 5-6). The operations further comprise in response to determining the physical location of the third location, displaying the third location on a map (FIG. 9).

Thus, not all embodiments are restricted to use of a GPS. For example, radio navigation may be used. Radio navigation or radionavigation is the application of radio frequencies to determine a position of an object on the Earth, either the vessel or an obstruction. Like radiolocation, it is a type of radiodetermination. Other means (a cellular network) may be used for location as well.

Also, determining a physical location of the third location may be achieved without the user actually walking to the physical location (FIG. 5). Instead, a user may drop a pin or other indicator on the map to indicate the physical location without physically visiting the physical location.

Example 2. The at least one medium of example 1, wherein the plurality of locations includes a first group of locations [e.g., group of seats] and a second group of locations [e.g., group of tailgates].

Figure 8:
FIG. 8 includes a GUI in an embodiment.
Figure 8:
Figure 8:

FIG. 8 illustrates how the second group of locations may be further subdivided into subgroups of the second group. A first subgroup includes the second location and a second subgroup includes the third location.

Example 3. The at least one medium according to any of examples 1-2, wherein the first location is included in the first group of locations, the second location is included in the second group of locations, and the third location is included in the second group of locations.

Example 4. The at least one medium according to any of examples 1-3, wherein displaying the third location on the map includes simultaneously displaying the second and third locations on the map along with a position of the user's computer node.

FIG. 9 shows the position of the user's computer node and the third location but does not display the second location. However, this is likely due to the timing of the screen dump shown on Page 11. Other embodiments will simultaneously show the position of the user's computer node as well as the "Endeavor" and "UTRules" tailgates.

Figure 3:
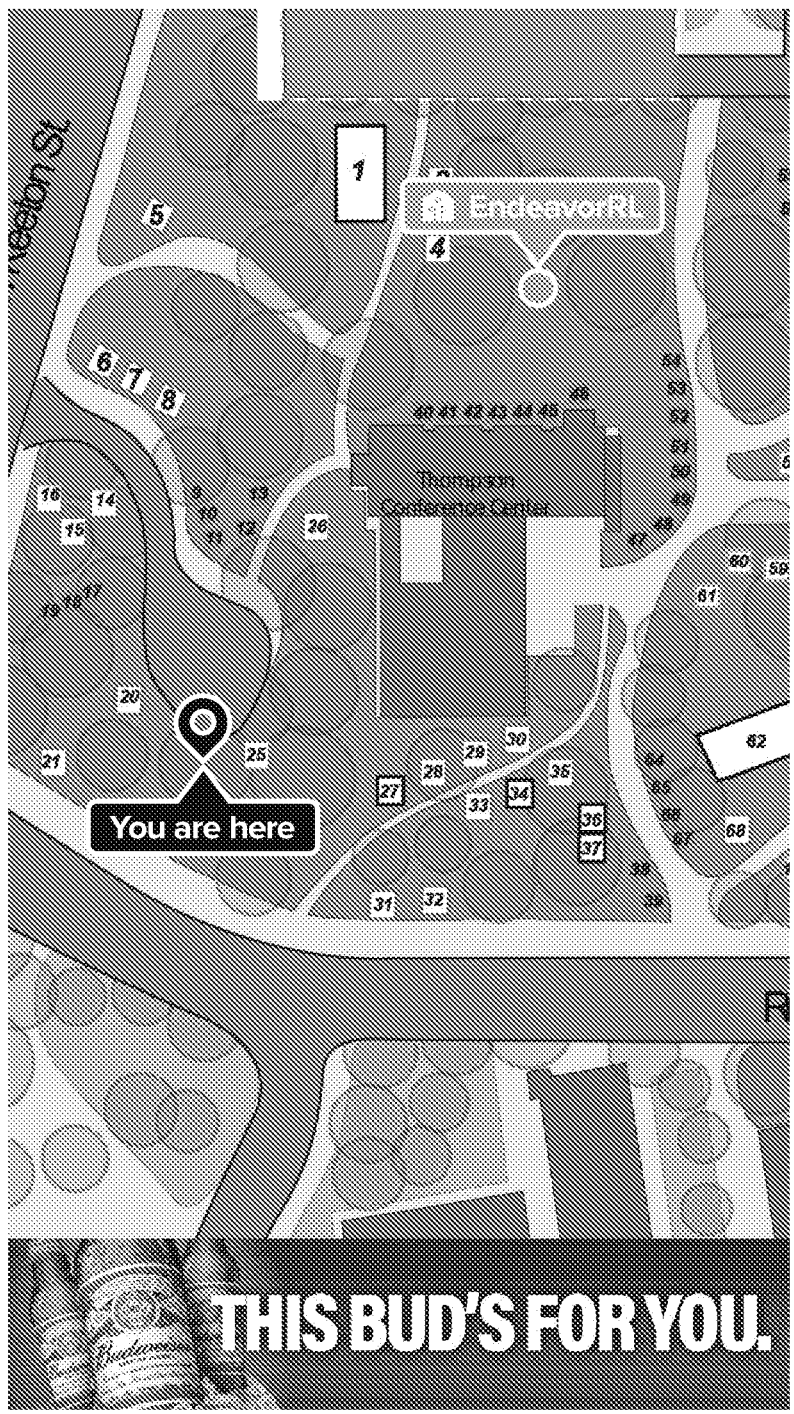
FIG. 3 includes a GUI in an embodiment.
Figure 4:
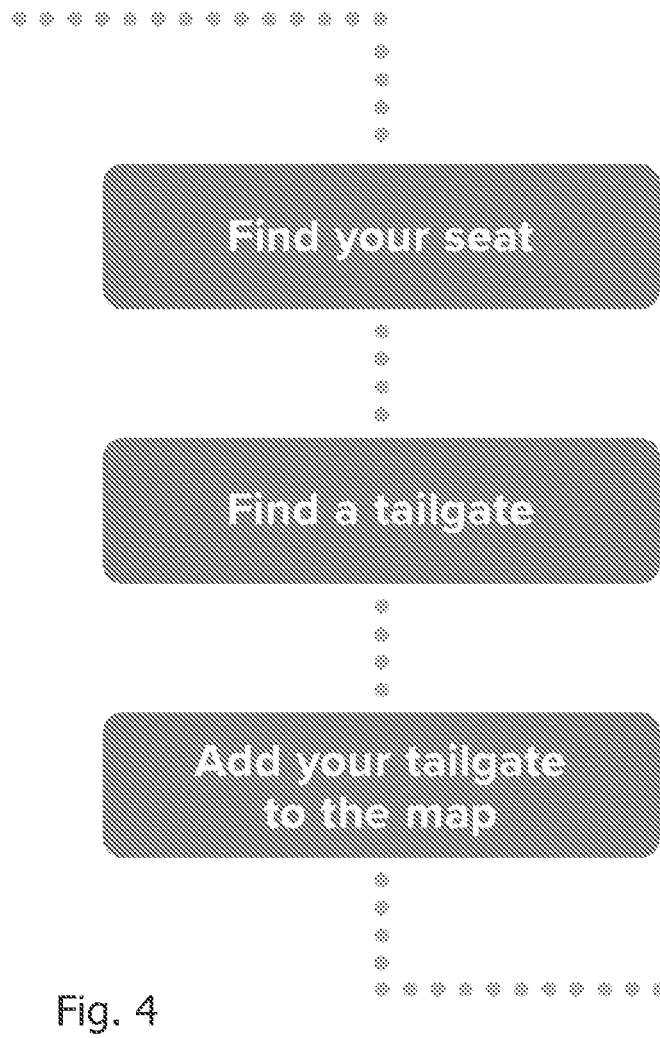
FIG. 4 includes a GUI in an embodiment.

Example 5. The at least one medium according to any of examples 1-4, the operations comprising, in response to a user selection of the GUI's second option, simultaneously displaying the second location on a map and the position of the user's computer node. (FIG. 3)

Example 6. The at least one medium according to any of examples 1-5, the operations comprising displaying on the map a route coupling the position of the user's computer node to at least one of the first, second, third locations, or combinations thereof.

Example 7. The at least one medium according to any of examples 1-6, the operations comprising: redisplaying the QR code after previously displaying the third location on the map (e.g., this could occur weeks after initially displaying the QR code). The operations further comprise, in response to redisplaying the QR code, redisplaying the GUI, wherein the redisplayed GUI displays: (1) the first option [e.g., the find your seat icon on FIG. 2] to locate the first location [e.g., a seat included a group of seats that has not changed since the first event] from an updated plurality of locations [e.g., the plurality of locations has changed because, while the seats in the football stadium have not changed, the number and/or arrangement of tailgates has changed so the totality of combined seats and tailgates has changed], (2) the second option [e,g., the find a tailgate icon on FIG. 2] to locate an updated second location [e.g., a tailgate in an updated group of tailgates] from the updated plurality of locations, and (3) the third option [e.g., the add your tailgate to the map—this option has not been updated because the icon itself has remained unchanged since the last event] to add an updated third location to the updated plurality of locations. FIG. 2. The operations further comprise, in response to a user selection of the GUI's third option, determining an updated physical location of the updated third location via the GPS (FIGS. 5-6). The operations further comprise in response to determining the updated physical location of the updated third location, displaying the updated third location on the map (FIG. 9).

Note the QR code has not necessarily changed. However, the data or information coupled to the QR code has changed.

Thus, for a football game at StateU during week1 (see, e.g., Example 1) a user may find his seat in a static grouping of seats at the nearby StateU stadium. While the available seats for purchase may change from week1 to week2, the "corpus" of seats remains generally fixed. An embodiment may provide visual directions (and/or audio directions) guiding the user to his or her seat. These directions may guide the user to StateU stadium ramp1 instead of ramp2 if ramp1 is closer to the user's seat. The user's seat may be known to the system by the user selecting a QR code located on the ticket. The system may then know to guide the user to seat1 located at the stadium. Before or after the event1 at the stadium, the user may desire to attend a tailgate or other such subevent associated with event1. During week1 at the time of user engagement there may be 100 tailgates entered into the system. This may be made visible to the user, such as shown on the list of tailgates hosted by the "Tailgate Guys" on page 10. The user may then receive directions to the desired tailgate. Of course, the user may not desire to visit an existing tailgate but instead desires to host his own tailgate. In that case, the user may choose the third option to enter his own tailgate location for week1 and, after doing so, his tailgate ("UTRules") may be made visible as a choice. The tailgate may be included in a subclassification ("general admission") which separates it from another subclassification (tailgates organized by "Tailgate Guys").

During week2 (see, e.g., Example 7), the event has some changes as compared to week1. For example, the stadium has not changed and the corpus of seats remains generally the same (regardless of whether the exact allotment of seats for purchase has changed). However, possibly event2 during week2 is less compelling that event1 during week1. As a result, before or after the event2 at the stadium, the user may desire to attend a tailgate or other such subevent associated with event2. During week2 at the time of user engagement there may be 50 tailgates entered into the system due to the less compelling nature of event2 as compared to event1 (which had 100 tailgates). This smaller corpus of tailgates may be made visible to the user, such as shown on the list of tailgates hosted by the "Tailgate Guys" on page 10. This rearrangement of tailgates means the general corpus of locations for the user to choose has changed since week1 since the overall corpus of seats+tailgates has changed since the tailgates have changed. The user may then receive directions to the desired tailgate. Of course, the user may not desire to visit an existing tailgate but instead desires to host his own tailgate. In that case, the user may choose the third option to enter his own tailgate location for week2 and, after doing so, his tailgate ("UTRules") may be made visible as a choice. The tailgate may be included in a subclassification ("general admission") which separates it from another subclassification (tailgates organized by "Tailgate Guys").

As used herein, the "GUI" is the same GUI even though its specific icons, coloring, and the like may change. For instance, the user interface is the general means for interfacing the user to help the user wayfind.

Alternative version of Example 7. The at least one medium according to any of Examples 1-6, the operations comprising: in response to again communicating with the QR code after previously displaying the third location on the map, redisplaying the GUI, wherein the redisplayed GUI displays: (1) the first option [e.g., the find your seat icon on FIG. 2] to locate the first location [e.g., a seat included a group of seats that has not changed since the first event] from an updated plurality of locations [e.g., the plurality of locations has changed because, while the seats in the football stadium have not changed, the number and/or arrangement of tailgates has changed to the totality of seats and tailgates has changed], (2) the second option [e.g., the find a tailgate icon on FIG. 2] to locate an updated second location [e.g., a tailgate in an updated group of tailgates] from the updated plurality of locations, and (3) the third option [e.g., the add your tailgate to the map—this option has not been updated because the icon itself has remained unchanged since the last event] to add an updated third location to the updated plurality of locations. FIG. 2. The operations further comprise in response to a user selection of the GUI's third option, determining an updated physical location of the updated third location via the GPS (FIGS. 5-6). The operations further comprise in response to determining the updated physical location of the updated third location, displaying the updated third location on the map (FIG. 9).

Thus, an alternative version does not require a QR code to be displayed digitally.

Example 8. The at least one medium of example 7, wherein the updated plurality of locations includes the first group of locations [e.g., group of seats] and an updated second group of locations [e.g., updated group of tailgates].

Example 9. The at least one medium according to any of examples 7-8, wherein the first location is included in the first group of locations, the updated second location is included in the updated second group of locations, and the updated third location is included in the updated second group of locations.

Example 10. The at least one medium according to any of example 7-9, wherein displaying the updated third location on the map includes simultaneously displaying the updated second location and the updated third location on the map along with an updated position of the user's computer node.

Example 11. The at least one medium according to any of examples 7-10, the operations comprising, in response to an updated user selection of the GUI's second option, simultaneously displaying the updated second location on the map and the updated position of the user's computer node. (FIG. 3)

Example 12. The at least one medium according to any of examples 7-11, the operations comprising displaying on the map an updated route coupling the updated position of the user's computer node to at least one of the first location, the updated second location, the updated third location, or combinations thereof.

For example, the route may include more than one location simultaneously to aid the user in determining whether, for example, walking to one of the locations is "too far out of the way" with regard to other locations the user wishes to visit.

Example 13. At least one computing node arranged to carry out the operations according to any one of examples 1 to 12.

Example 14. An apparatus comprising means for performing the operations according to any one of examples 1 to 12.

Example 1a. An apparatus comprising: at least one memory and at least one processor, coupled to the at least one memory, to perform operations comprising: displaying a QR code; in response to displaying the QR code, displaying a first graphical user interface (GUI), wherein the first GUI displays: (1) a first option to locate a first location from a plurality of locations, (2) a second option to locate a second location from the plurality of locations, and (3) a third option to add a third location to the plurality of locations; in response to a user selection of the GUI's third option, determining the physical location of the third location via a global positioning system (GPS); in response to determining the physical location of the third location, displaying the third location on a map.

Example 2a. The apparatus of example 1a, wherein the plurality of locations includes a first group of locations and a second group of locations.

Example 3a. The apparatus according to any of example 1a-2a, wherein the first location is included in the first group of locations, the second location is included in the second group of locations, and the third location is included in the second group of locations.

Example 4a. The apparatus according to any of examples 1a-3a, wherein displaying the third location on the map includes simultaneously displaying the second and third locations on the map along with a position of the user's computer node.

Example 5a. The apparatus according to any of examples 1a-4a, the operations comprising, in response to a user selection of the GUI's second option, simultaneously displaying the second location on a map and the position of the user's computer node.

Example 6a. The system according to any of examples 1a-5a, the operations comprising displaying on the map a route coupling the position of the user's computer node to at least one of the first, second, and third locations.

Example 7a. The system according to any of examples 1-6, the operations comprising: redisplaying the QR code after previously displaying the third location on the map; in response to redisplaying the QR code, redisplaying the first GUI, wherein the redisplayed first GUI displays: (1) the first option to locate the first location from an updated plurality of locations [the plurality of locations has changed because, while the seats in the football stadium have not changed, the number and/or arrangement of tailgates has changed to the totality of seats and tailgates has changed], (2) the second option to locate an updated second location from the updated plurality of locations, and (3) the third option to add an updated third location to the updated plurality of locations; in response to a user selection of the GUI's third option, determining an updated physical location of the updated third location via the GPS; in response to determining the updated physical location of the updated third location, displaying the updated third location on the map.

Example 8a. The system of example 7a, wherein the updated plurality of locations includes the first group of locations and an updated second group of locations.

Example 9a. The system according to any of examples 7-8, wherein the first location is included in the first group of locations, the updated second location is included in the updated second group of locations, and the updated third location is included in the updated second group of locations.

Example 10a. The system according to any of examples 7-9, wherein displaying the updated third location on the map includes simultaneously displaying the updated second location and the updated third location on the map along with an updated position of the user's computer node.

Example 11a. The system according to any of examples 7-10, the operations comprising, in response to an updated user selection of the GUI's second option, simultaneously displaying the updated second location on the map and the updated position of the user's computer node.

Example 12a. The system according to any of examples 7a-11a, the operations comprising displaying on the map a route coupling the updated position of the user's computer node to at least one of the first location, the updates second location, the updated third location, or combinations thereof.

Figure 10:
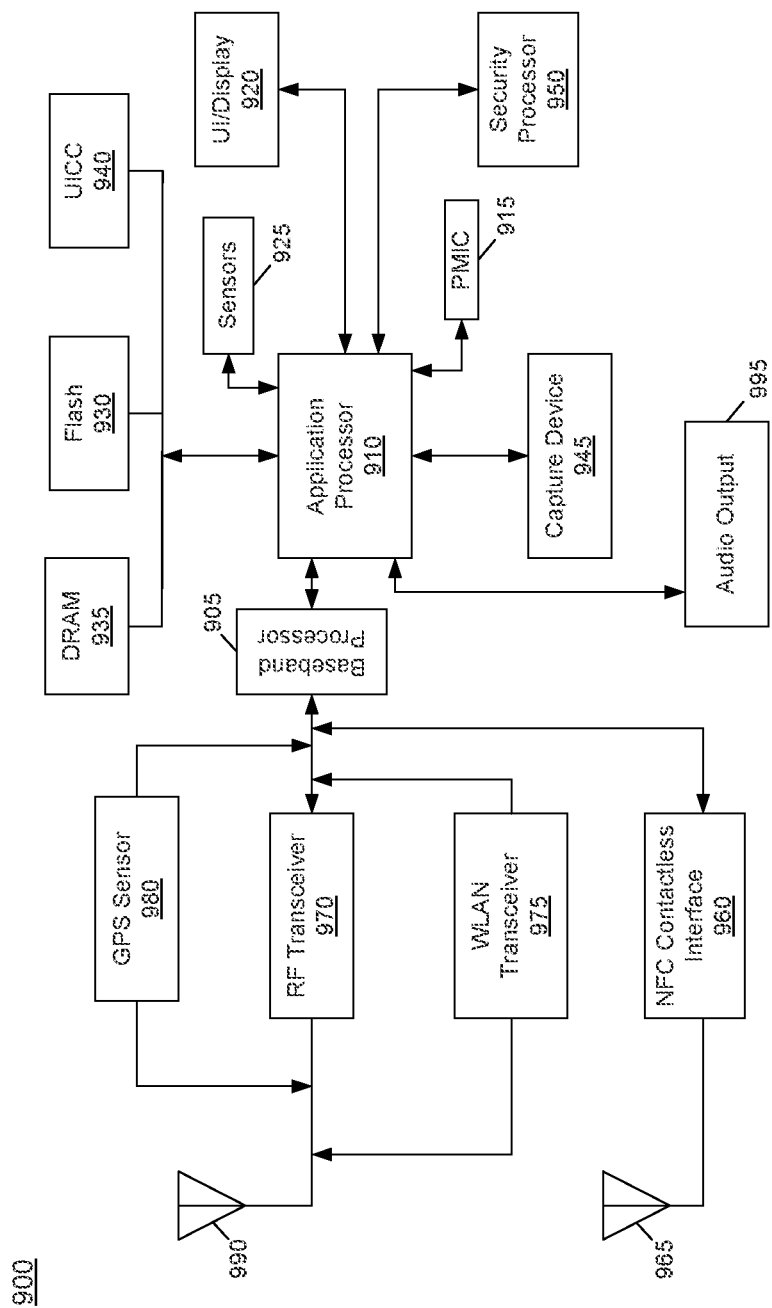
FIGS. 10, 11, 12 include systems for implementing embodiments.

FIG. 10 includes a block diagram of an example system with which embodiments can be used. As seen, system 900 may be a smartphone or other wireless communicator or any other Internet of Things (IoT) device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920 (e.g., touch screen display). In addition, application processor 910 may couple to a memory system including a non-volatile memory, namely a flash memory 930 and a system memory, namely a DRAM 935. As further seen, application processor 910 also couples to a capture device 945 such as one or more image capture devices that can record video and/or still images.

A universal integrated circuit card (UICC) 940 comprises a subscriber identity module, which in some embodiments includes a secure storage to store secure user information. System 900 may further include a security processor 950 (e.g., Trusted Platform Module (TPM)) that may couple to application processor 910. A plurality of sensors 925, including one or more multi-axis accelerometers may couple to application processor 910 to enable input of a variety of sensed information such as motion and other environmental information. In addition, one or more authentication devices may be used to receive, for example, user biometric input for use in authentication operations.

As further illustrated, a near field communication (NFC) contactless interface 960 is provided that communicates in an NFC near field via an NFC antenna 965. While separate antennae are shown, understand that in some implementations one antenna or a different set of antennae may be provided to enable various wireless functionalities.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more internet of things (IoT) networks, various circuits may be coupled between baseband processor 905 and antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 5G wireless communication protocol such as in accordance with a code division multiple access (CDMA), global system for mobile communication (GSM), long term evolution (LTE) or other protocol. In addition, a GPS sensor 980 may be present, with location information being provided to security processor 950. Other wireless communications such as receipt or transmission of radio signals (e.g., AM/FM) and other signals may also be provided. In addition, via WLAN transceiver 975, local wireless communications, such as according to a Bluetooth™ or IEEE 802.11 standard can also be realized.

Figure 11:
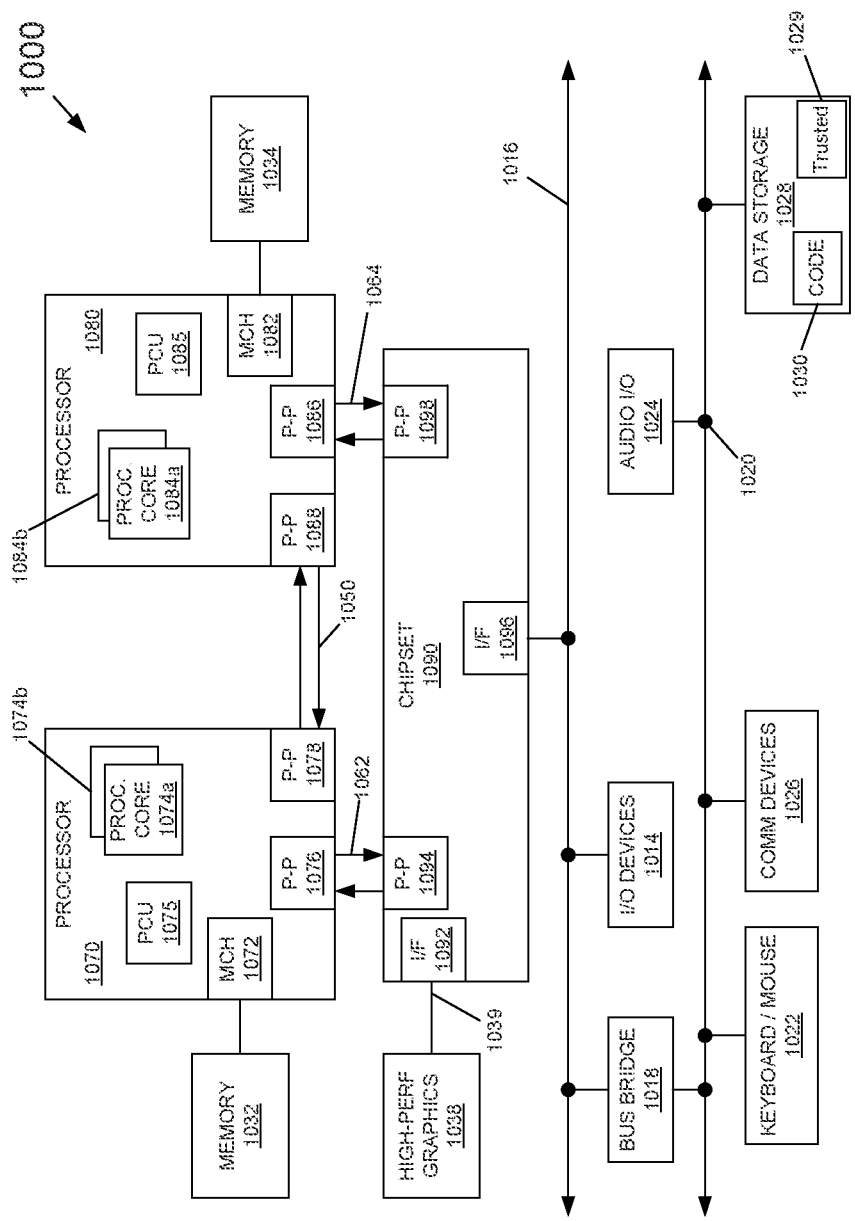

FIG. 11 shows a block diagram of a system in accordance with another embodiment of the present invention. Multiprocessor system 1000 is a point-to-point interconnect system such as a server system, and includes a first processor 1070 and a second processor 1080 coupled via a point-to-point interconnect 1050. Each of processors 1070 and 1080 may be multicore processors such as SoCs, including first and second processor cores (i.e., processor cores 1074*a* and 1074*b* and processor cores 1084*a* and 1084*b*), although potentially many more cores may be present in the processors. In addition, processors 1070 and 1080 each may include power controller unit 1075 and 1085. In addition, processors 1070 and 1080 each may include a secure engine to perform security operations such as attestations, IoT network onboarding or so forth.

First processor 1070 further includes a memory controller hub (MCH) 1072 and point-to-point (P-P) interfaces 1076 and 1078. Similarly, second processor 1080 includes a MCH 1082 and P-P interfaces 1086 and 1088. MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1062 and 1064, respectively. Chipset 1090 includes P-P interfaces 1094 and 1098.

Furthermore, chipset 1090 includes an interface 1092 to couple chipset 1090 with a high-performance graphics engine 1038, by a P-P interconnect 1039. In turn, chipset 1090 may be coupled to a first bus 1016 via an interface 1096. Various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 12:
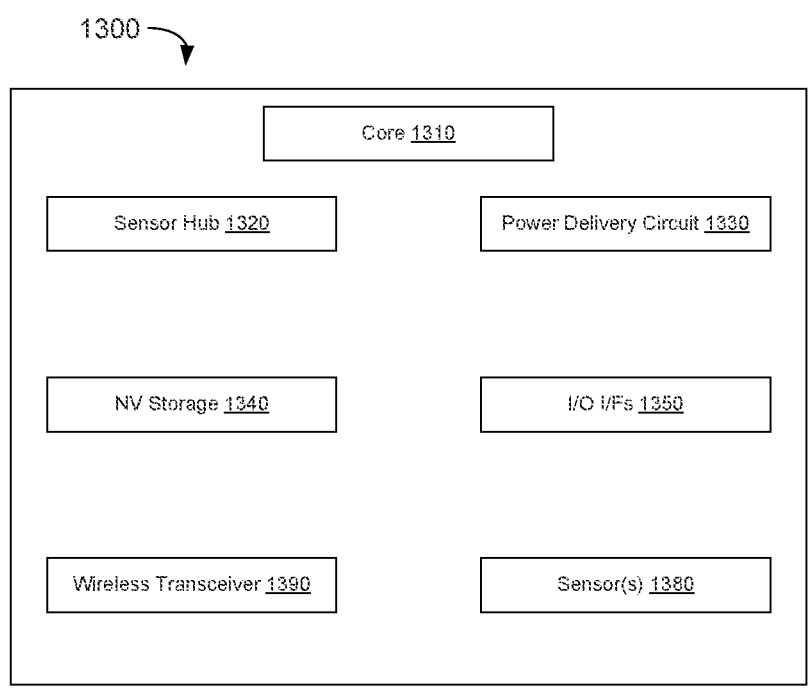

FIG. 12 depicts an IoT environment that may include wearable devices or other small form factor IoT devices. In one particular implementation, wearable module 1300 may be an Intel® Curie™ module that includes multiple components adapted within a single small module that can be implemented as all or part of a wearable device. As seen, module 1300 includes a core 1310 (of course in other embodiments more than one core may be present). Such a core may be a relatively low complexity in-order core, such as based on an Intel Architecture® Quark™ design. In some embodiments, core 1310 may implement a Trusted Execution Environment (TEE). Core 1310 couples to various components including a sensor hub 1320, which may be configured to interact with a plurality of sensors 1380, such as one or more biometric, motion, environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I2C/GPIO protocols, may be present. In addition, a wireless transceiver 1390, which may be a Bluetooth™ low energy or other short-range wireless transceiver is present to enable wireless communications as described herein. In different implementations a wearable module can take many other forms. Wearable and/or IoT devices have, in comparison with a typical general-purpose CPU or a GPU, a small form factor, low power requirements, limited instruction sets, relatively slow computation throughput, or any of the above.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, and the like. Program code may be transmitted in the form of packets, serial data, parallel data, and the like, and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. For example, terms designating relative vertical position refer to a situation where a side of a substrate is the "top" surface of that substrate; the substrate may actually be in any orientation so that a "top" side of a substrate may be lower than the "bottom" side in a standard terrestrial frame of reference and still fall within the meaning of the term "top." The term "on" as used herein (including in the claims) does not indicate that a first layer "on" a second layer is directly on and in immediate contact with the second layer unless such is specifically stated; there may be a third layer or other structure between the first layer and the second layer on the first layer. The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. At least one non-transitory machine-readable medium having stored thereon data which, if used by at least one machine, causes the at least one machine to perform operations comprising:
    displaying a QR code;
    in response to displaying the QR code, displaying a graphical user interface (GUI), wherein the GUI displays: (1) a first option to locate a first location from a plurality of locations, (2) a second option to locate a second location from the plurality of locations, and (3) a third option to add a third location to the plurality of locations;
    in response to a user selection of the GUI's third option, determining a physical location of the third location via a global positioning system (GPS);
    in response to determining the physical location of the third location, displaying the third location on a map;
    wherein displaying the third location on the map includes simultaneously displaying the second and third locations on the map along with a position of a computer node of the user.

2. The at least one medium of claim 1, wherein the plurality of locations includes a first group of locations and a second group of locations.

3. The at least one medium according to claim 2, wherein the first location is included in the first group of locations, the second location is included in the second group of locations, and the third location is included in the second group of locations.

4. The at least one medium according to claim 1, the operations comprising, in response to a user selection of the GUI's second option, simultaneously displaying the second location on the map and the position of the user's computer node.

5. The at least one medium according to claim 4, the operations comprising displaying on the map a route coupling the position of the user's computer node to at least one of the first, second, or third locations, or combinations thereof.

6. The at least one medium according to claim 1, the operations comprising:
    redisplaying the QR code after previously displaying the third location on the map;
    in response to redisplaying the QR code, redisplaying the GUI, wherein the redisplayed GUI displays: (1) the first option to locate the first location from an updated plurality of locations, (2) the second option to locate an updated second location from the updated plurality of locations, and (3) the third option to add an updated third location to the updated plurality of locations;
    in response to a user selection of the redisplayed GUI's third option, determining an updated physical location of the updated third location via the GPS;
    in response to determining the updated physical location of the updated third location, displaying the updated third location on the map.

7. The at least one medium of claim 3, the operations comprising:
    redisplaying the QR code after previously displaying the third location on the map;
    in response to redisplaying the QR code, redisplaying the GUI, wherein the redisplayed GUI displays: (1) the first option to locate the first location from an updated plurality of locations, (2) the second option to locate an updated second location from the updated plurality of locations, and (3) the third option to add an updated third location to the updated plurality of locations;
    in response to a user selection of the redisplayed GUI's third option, determining an updated physical location of the updated third location via the GPS;

in response to determining the updated physical location of the updated third location, displaying the updated third location on the map;

wherein the updated plurality of locations includes the first group of locations and an updated second group of locations.

8. The at least one medium according to claim 7, wherein the first location is included in the first group of locations, the updated second location is included in the updated second group of locations, and the updated third location is included in the updated second group of locations.

9. The at least one medium according to claim 8, wherein displaying the updated third location on the map includes simultaneously displaying the updated second location and the updated third location on the map along with an updated position of the user's computer node.

10. The at least one medium according to claim 9, the operations comprising, in response to a user selection of the redisplayed GUI's second option, simultaneously displaying the updated second location on the map and the updated position of the user's computer node.

11. The at least one medium according to claim 10, the operations comprising displaying on the map an updated route coupling the updated position of the user's computer node to at least one of the first location, the updated second location, the updated third location, or combinations thereof.

12. An apparatus comprising:

at least one memory and at least one processor, coupled to the at least one memory, to perform operations comprising:

displaying a QR code;

in response to displaying the QR code, displaying a first graphical user interface (GUI), wherein the first GUI displays: (1) a first option to locate a first location from a plurality of locations, (2) a second option to locate a second location from the plurality of locations, and (3) a third option to add a third location to the plurality of locations;

in response to a user selection of the GUI's third option, determining a physical location of the third location via a global positioning system (GPS);

in response to determining the physical location of the third location, displaying the third location on a map;

redisplaying the QR code after previously displaying the third location on the map;

in response to redisplaying the QR code, redisplaying the first GUI, wherein the redisplayed first GUI displays: (1) the first option to locate the first location from an updated plurality of locations, (2) the second option to locate an updated second location from the updated plurality of locations, and (3) the third option to add an updated third location to the updated plurality of locations;

in response to a user selection of the redisplayed GUI's third option, determining an updated physical location of the updated third location via the GPS;

in response to determining the updated physical location of the updated third location, displaying the updated third location on the map.

13. The apparatus of claim 12, wherein the plurality of locations includes a first group of locations and a second group of locations.

14. The apparatus according to claim 13, wherein the first location is included in the first group of locations, the second location is included in the second group of locations, and the third location is included in the second group of locations.

15. The apparatus according to claim 14, wherein displaying the third location on the map includes simultaneously displaying the second and third locations on the map along with a position of a computer node of the user.

16. The apparatus according to claim 15, the operations comprising, in response to a user selection of the GUI's second option, simultaneously displaying the second location on a map and the position of the user's computer node.

17. The apparatus according to claim 16, the operations comprising displaying on the map a route coupling the position of the user's computer node to at least one of the first, second, and third locations.

18. The apparatus of claim 13, wherein the updated plurality of locations includes the first group of locations and an updated second group of locations.

* * * * *